United States Patent [19]

Tagawa et al.

[11] Patent Number: 5,297,130
[45] Date of Patent: Mar. 22, 1994

[54] DRIVING APPARATUS AND A RECORDING AND/OR REPRODUCING APPARATUS USING THE SAME

[75] Inventors: Masahiro Tagawa, Atsugi; Toshihiko Miyazaki, Hiratsuka; Toshimitsu Kawase, Atsugi, all of Japan

[73] Assignee: Canon Kabushiki Kaisha, Tokyo, Japan

[21] Appl. No.: 832,595

[22] Filed: Feb. 7, 1992

[30] Foreign Application Priority Data

Feb. 8, 1991 [JP] Japan .................. 3-37746

[51] Int. Cl.⁵ .................. G11B 9/08; H01L 41/08
[52] U.S. Cl. .................. 369/126; 250/306; 250/307; 369/101; 369/118; 369/151; 310/317
[58] Field of Search .......... 369/126, 101; 365/151, 365/118, 157; 250/306, 307; 310/317, 316

[56] References Cited

U.S. PATENT DOCUMENTS

| | | | |
|---|---|---|---|
| 3,786,332 | 1/1974 | Hepner et al. ............... | 318/577 |
| 4,798,989 | 1/1989 | Miyazaki et al. ............ | 250/306 |
| 4,841,191 | 6/1989 | Takata et al. ............... | 250/306 |
| 4,947,077 | 8/1990 | Murata ....................... | 310/317 |
| 4,992,659 | 2/1991 | Abraham et al. ............ | 250/306 |
| 4,998,016 | 3/1991 | Nose et al. .................. | 250/306 |
| 5,075,548 | 12/1991 | Kajimura .................... | 369/126 X |
| 5,083,056 | 1/1992 | Kondou et al. .............. | 310/317 X |

FOREIGN PATENT DOCUMENTS

| | | |
|---|---|---|
| 0361932 | 4/1990 | European Pat. Off. . |
| 0388027 | 9/1990 | European Pat. Off. . |
| 0397116 | 11/1990 | European Pat. Off. . |
| 1-287403 | 11/1989 | Japan .................. 250/306 |
| 0147804 | 6/1990 | Japan .................. 250/306 |
| 2006541A | 5/1979 | United Kingdom . |
| 2179212A | 2/1987 | United Kingdom . |
| 2232294A | 12/1990 | United Kingdom . |

Primary Examiner—Paul M. Dzierzynski
Assistant Examiner—David V. Bruce
Attorney, Agent, or Firm—Fitzpatrick, Cella, Harper & Scinto

[57] ABSTRACT

A driving apparatus for driving an object comprises a pair of piezoelectric elements, one of them being arranged on the one side of the object while the other of them on the other side of the object, and the respective electrode arrangement directions of the pair of piezoelectric elements being substantially identical to each other, and a control circuit which applies a predetermined voltage across the outer electrodes of the pair of piezoelectric elements respectively, gives an equipotential to the inner electrodes thereof, and causes the pair of piezoelectric elements to drive the object by varying the value of the potential given to the inner electrodes. Hence, the increased amount of a voltage applied to one piezoelectric element is exactly identical to the decreased amount for the other so as to make the extended and contracted amounts of the piezoelectric elements on both sides of the object the same. Consequently, no useless stress is given to the piezoelectric elements for the prevention of the deterioration of the elements to implement a precise fine driving over a long period.

25 Claims, 5 Drawing Sheets

DRIVING APPARATUS AND A RECORDING AND/OR REPRODUCING APPARATUS USING THE SAME

BACKGROUND OF THE INVENTION

1. Field of the Invention

The present invention relates to a driving apparatus and a recording and/or reproducing apparatus using the driving apparatus, which is preferably suited for a scanning type tunnel microscope and other apparatuses which requires a precise positioning control.

2. Related Background Art

A conventionally known fine movement driving means is structured, as disclosed in U.S. Pat. No. 3,786,332, for example, to drive a portion to be driven in such a manner that one of the piezoelectric elements provided before and after the driven portion in its driving direction is contracted while the other is extended.

Figure 1:
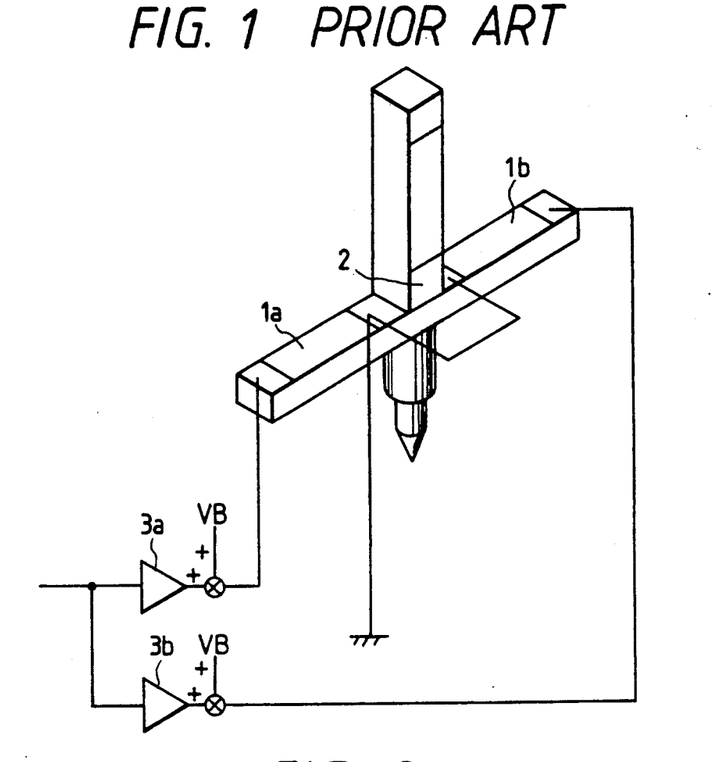
FIG. 1 is a view illustrating a conventional fine movement driving apparatus.

As an actual driving method, such as apparatus as shown in FIG. 1 is known. In this case, a fine movement driving mechanism is constructed to sandwich a movable portion 2 by arranging in series a pair of polarized piezoelectric elements 1a and 1b having the same characteristics in forward direction. Then, while bias voltages VB in forward direction having the same intensity are applied to both piezoelectric elements 1a and 1b to extend them by the same amount, each one driving signal is amplified by two amplifiers 3a and 3b having opposite output polarity to each other to superimpose the driving signals thus obtained each having opposite phases, whereby the applied voltages are increased or decreased so that the directions in which the two piezoelectric elements 1a and 1b are extended in such an amount are made opposite to each other, thus enabling the movable portion 2 to be moved.

Nevertheless, in the above-mentioned case, unless the characteristics of the two amplifiers 3a and 3b are exactly symmetrical in their opposite polarities, there occurs a drawback that a delicate difference is generated between the driving voltages applied to both piezoelectric elements, and when one piezoelectric element 1a is extended, the other piezoelectric element 1b is not contracted equally by the same amount, for example. As a result, useless stress is given to each of the piezoelectric elements 1a and 1b, hence leading to the earlier deterioration of the piezoelectric elements 1a and 1b.

SUMMARY OF THE INVENTION

In consideration of the aforesaid drawback existing in the conventional art, it is a first object of the present invention to provide a driving apparatus capable of performing accurate fine movement drivings with an improved durability and safety of the apparatus itself and an information recording and/or reproducing apparatus using such a driving apparatus.

The above-mentioned and other objects, features and advantages of the present invention will become apparent by reference to the detailed description of the preferred embodiments which will be given below.

DETAILED DESCRIPTION OF THE PREFERRED EMBODIMENTS

A driving apparatus of the embodiments given below is characterized in that a pair of piezoelectric elements capable of extension and contraction are arranged before and after a driven portion in its driving direction, and that a constant potential is applied to each of outer electrodes of the piezoelectric elements, and a driving voltage is applied to inner electrodes to vary the driving potential, thereby causing the extension and contraction of the pair of piezoelectric elements to be opposite to each other.

For the driving apparatus of the above-mentioned structure, the sum of the voltages applied to the respective piezoelectric elements is always equal to the constant voltage. Therefore, it is possible to increase or decrease the voltages applied to the two piezoelectric elements by varying only one driving voltage, and the increased amount of a voltage applied to one of the piezoelectric elements is exactly identical to the decreased amount of the voltage applied to the other.

Subsequently, in accordance with an embodiment shown in FIG. 2 through FIG. 4, the detailed description will be made.

Figure 2:
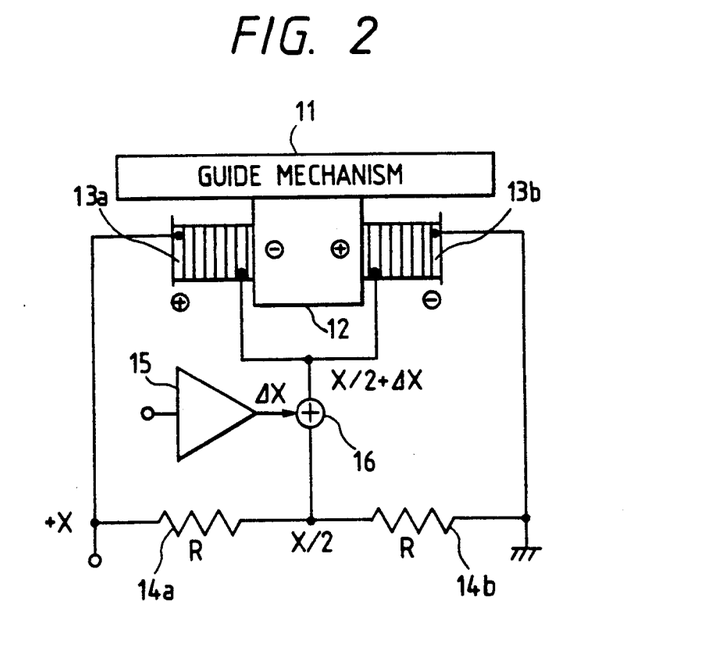
FIG. 2 is a view illustrating the principles of a first embodiment according to the present invention.

FIG. 2 is a view illustrating the principles of a first embodiment according to the present invention, in which piezoelectric elements 13a and 13b are arranged on both sides of a movable portion 12 slidably mounted on a guide mechanism 11. Both elements are polarized in the same direction so that, for example, positive pole appears in the left end sides of both elements.

A negative pole electrode of the piezoelectric element 13b on the right hand side thus arranged, for example, is grounded with a standard potential, and a constant voltage of an X(V), for example, is applied to a positive pole electrode of the other piezoelectric element 13a. In this way, the direction of the applied voltages to the piezoelectric elements always accords with the direction of polarization. The applied voltage is divided into an intermediate potential of an X/2 (V) which can be obtained by two resistors 14a and 14b having the same resistance value R. Also, a driving voltage of a ΔX (V), for example, is obtained on the basis of the driving signals derived from an amplifier 15. X/2+ΔX (V), which is obtained by adding both of them by an adder 16, is applied between the respective remaining electrodes of the piezoelectric elements 13a and 13b.

Thus, when the driving voltage ΔX is varied according to the variation of driving signal, the voltages applied between the electrodes on both sides of the respective two piezoelectric elements 13a and 13b are increased/decreased as center of X/2, respectively. Therefore, the applied potentials to the piezoelectric elements 13a and 13b are increased on one side and decreased on the other side, respectively. As a result, one of the piezoelectric elements 13a and 13b is extended while the other is contracted.

Figure 3:
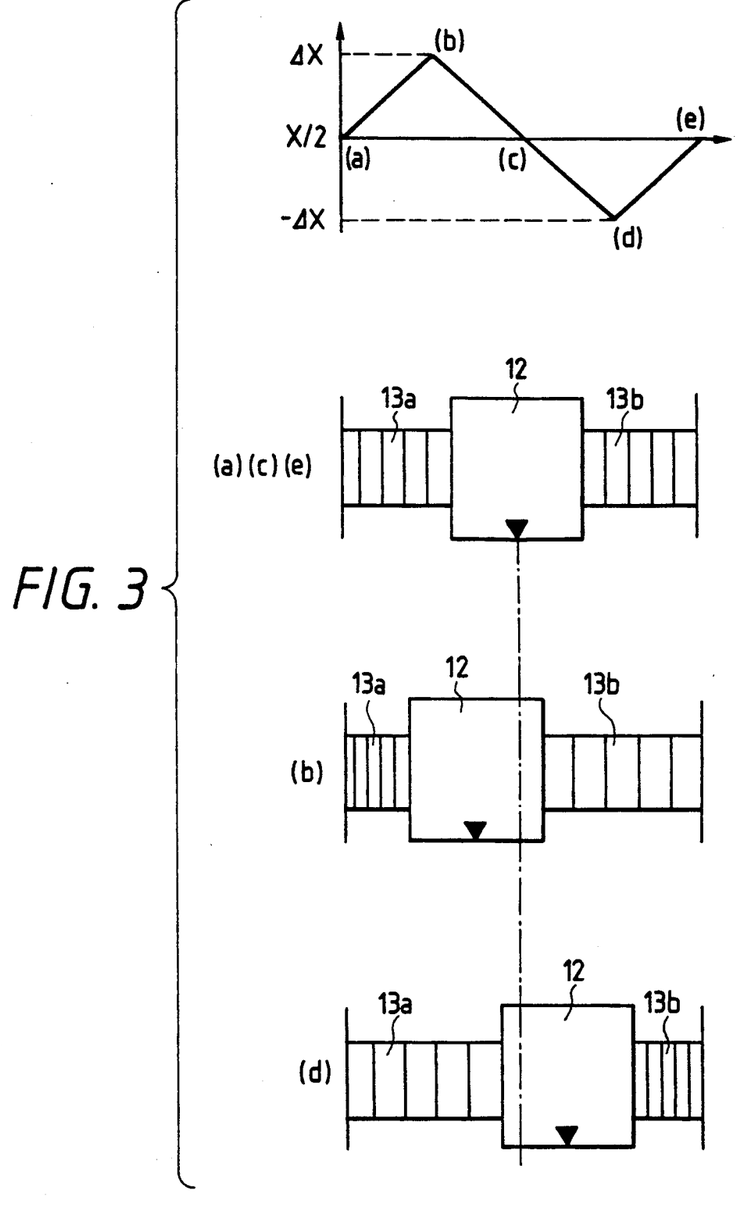
FIG. 3 is a view illustrating the movements of a movable portion.

For example, in FIG. 3 which shows the voltage variations, if the driving voltages ΔX are zero in an equilibrium state as in the cases (a), (c), and (e), the output of the adder 16 is an X/2 (V). Therefore, the same voltage of X/2 is applied to both piezoelectric elements 13a and 13b, respectively, so that each piezoelectric elements is extended by the same amount to cause the movable portion 12 to be positioned in the center. On the other hand, if the positive driving voltage ΔX is given as in the case of (b), the output of the adder 16 is X/2+ΔX (V), so that the X/2+ΔX (V) is applied to the piezoelectric element 13b on the grounded side while a voltage of an X/2−ΔX (V) is applied to the other piezoelectric element 13a. As a result, the piezoelectric elements 13a and 13b are symmetrically contracted and extended, respectively, by the amount corresponding to the ΔX (V) as the extension amount in the case of X/2 is made reference. Therefore, if only the end portions at the outer sides of both piezoelectric elements 13a and 13b are regulated, it is possible to drive the movable portion 12 in the left hand direction along the guide mechanism 11. In this respect, if the driving voltage is made a−ΔX (V) as in the case of (d), the reverse extension and contraction occur, so that the movable portion 12 is driven in the right hand direction.

Thus, in the present invention, only one amplifier 15 is used for varying the driving voltages applied to the two piezoelectric elements 13a and 13b each arranged on the right and left hand sides, respectively. It is therefore possible to reverse the extension and contraction of the piezoelectric elements 13a and 13b easily and highly precisely, hence enabling to realize the accurate driving of the movable portion 12. It may be possible to drive the movable portion 12 by reversing the left and right side relationship of the piezoelectric elements 13a and 13b to the movable portion 12 without changing the above-mentioned wiring. In this case, the driving direction of the movable portion 12 becomes opposite to the direction set forth above.

Figure 4:
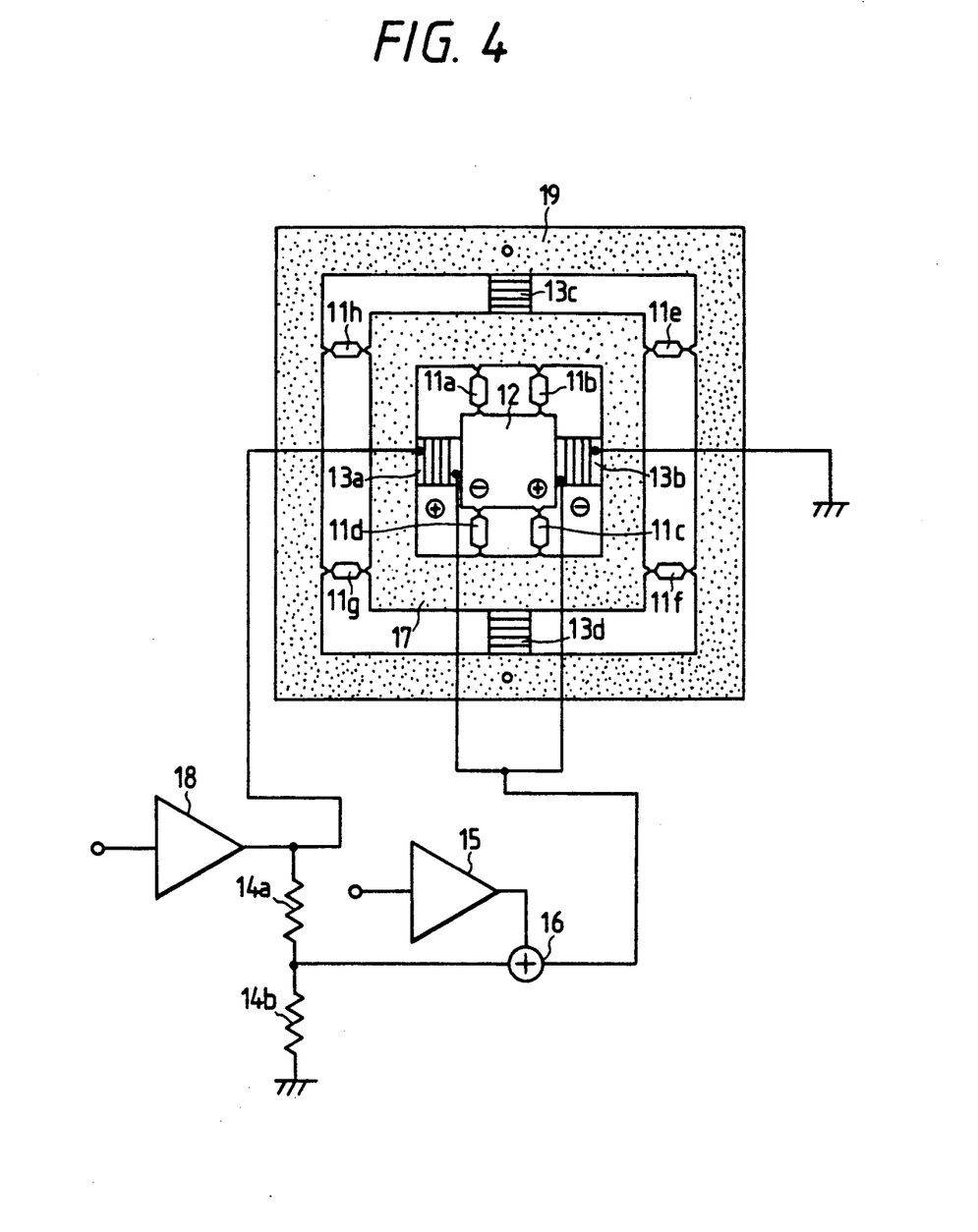
FIG. 4 is a view illustrating the structure of a fine movement driving mechanism according to the first embodiment.

FIG. 4 is a view showing the structure of the present embodiment, in which the same reference numerals in FIG. 2 designate the same members. In FIG. 4, the movable portion 12 which can be driven in the left and right hand directions of the drawing is arranged in the center of a first frame 17 by a guide mechanism comprising resilient hinge springs 11a, 11b, 11c and 11d. The piezoelectric elements 13a and 13b of a sensitivity 0.1 (μm/V), for example, are arranged in the left and right side spaces between the movable portion 12 and the frame 17 so as to be extended ±5 (μm), respectively, each time a voltage of ±50 (V) is applied.

In the present embodiment, each resistance value R of the resistors 14a and 14b is equal and is 10 kΩ, for example. The gain of the amplifier 15 is 10 times. Also, as a constant voltage X, 100 (V) is applied by a high voltage amplifier 18. Also, a second frame 19 is arranged outside the first frame 17, and the first frame 17 is supported by the second frame 19 through the guide mechanism comprising resilient hinge springs 11e, 11f, 11g and 11h so as to be movable in the vertical direction in FIG. 4. Then, by piezoelectric elements 13c and 13d arranged in the upper and lower spaces, the frame 17 and the movable portion 12 can be driven relatively in the vertical direction in FIG. 4. The power supply circuit for driving the piezoelectric elements 13c and 13d are structured so as to be the same circuit as that shown in FIG. 4 to drive the piezoelectric elements 13a and 13b, but it is not shown in FIG. 4 to avoid any complication. In the present embodiment, the second frame 19 is fixedly arranged.

In the above-mentioned structure, when the driving signal is zero for the piezoelectric elements 13a and 13b, that is, the driving voltage from the amplifier 15 is zero, the voltage of 50 (V) divided by the resistors 14a and 14b is applied to each of the piezoelectric elements 13a and 13b. Then, the piezoelectric elements 13a and 13b are extended equally by 5 μm, respectively, and the left and right side spaces between the movable portion 12 and the frame 17 become equal amount. In this state, if a triangular wave having its maximum amplitude of ±1 (V) is inputted into the amplifier 15 as a driving signal, a driving voltage having an amplitude of ±10 (V), can be obtained. If, for example ΔX=±10 (V), the output of the adder 16 becomes 60 (V), and 40 (V) is applied to the piezoelectric element 13a while 60 (V) is applied to the piezoelectric element 13b. As a result, the piezoelectric element 13a is extended by 4 (μm) and the piezoelectric element 13b by 6 (μm) from the initial length, respectively, thus enabling the movable portion 12 to be displaced from the center to the left side by one (1) (μm) against the frame 17. On the contrary, if ΔX=−10 (V), the output of the adder 16 becomes 40 (V). Consequently, the movable portion 12 is displaced from the center to the right side by one (1) (μm). The driving control is given to the piezoelectric elements 13c and 13d in the same manner to perform the fine movement of the movable portion 12 in the vertical direction.

Thus, in the present embodiment, by varying the driving voltage ΔX within the maximum range of −50 (V) to +50 (V), the position of the movable portion 12 can freely be controlled within a range of 5 (μm) from the center to the left and right sides and upper and lower sides each. To this end, it suffices if only the driving signal to be inputted into the amplifier 15 is varied within a range of −5 (V) to ±5 (V). It is also possible to oscillate the movable portion 12 easily without any distortion by inputting triangular wave signals or sinusoidal wave signals.

In the above-mentioned embodiment, the resistance value for the resistors 14a and 14b is selected to the equal, but it may be possible to divide the resistance value unequally into 7:3 or the like so that the reference position is displaced from the center when the driving voltage ΔX is zero.

In order to prevent the piezoelectric element 13 from deteriorating, it is desirable to make a regulation so that any electric filed opposite to the polarization direction is not applied to the piezoelectric elements 13a and 13b when the driving voltage ΔX exceeds a constant voltage X or becomes lower than the grounding potential in any of the cases described above.

Figure 5:
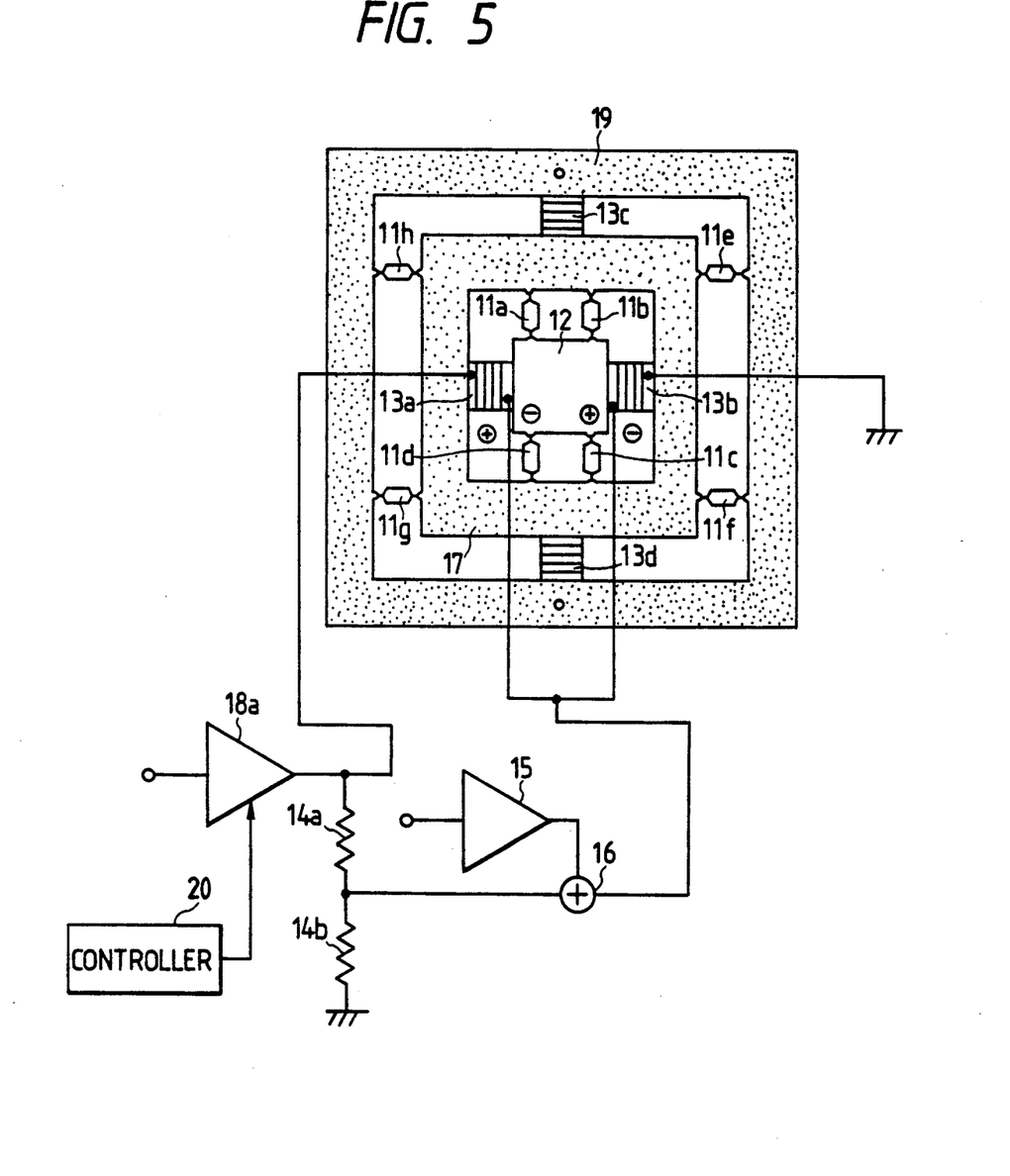
FIG. 5 is a view illustrating the structure of a fine movement driving mechanism according to a second embodiment.

FIG. 5 is a view illustrating a second embodiment according to the present invention. The present embodiment differs from the first embodiment in only a point that the high voltage amplifier 18 is replaced with a high voltage amplifier 18a capable of varying amplification and that an amplification factor controller 20 is newly provided to control the amplification factor of the amplifier 18a.

In these embodiments, while the piezoelectric elements are inserted in the left and right sides of the movable portion 12 and the frame 17, it is difficult to machine highly precisely the portion where the piezoelectric elements are inserted. If, for example, machining errors occur upon manufacturing of certain apparatus, there are inevitably generated some differences in the preloads given to the piezoelectric elements for usual fine movement driving apparatus when a voltage is applied to the piezoelectric elements which are fixed in the same manner. In such a state that the preload given to the piezoelectric elements of the apparatus in which such machining errors have occurred is too great, it becomes impossible to obtain the anticipated amount of the displacement. More specifically, there is a possibility that depending on the machining precision, the fluctuation will result in approximately ±10 (kgf) in terms of the preload and ±0.1 (μm) in terms of the displacement amount of the piezoelectric element. In this case, an adjustment can be made by varying the voltage applied to the electrode on the positive side of the piezoelectric element 13a by the high voltage amplifier 18a through the amplification factor controller 20 which is operated by a manufacturer of the apparatus. More specifically, with the fluctuation of approximately ±5 (V) the preload given to the piezoelectric elements can be adjusted to regulate the displacement amounts.

For example, if the preload is too great as described above, the amplification factor is reduced by the controller 20 so that the voltage applied to the electrode on the positive side of the piezoelectric element 13a is reduced.

In this way, since the constant voltage applied to each outer side of the piezoelectric elements can be varied, the displacement amounts of the movable portion can be made even, and it is possible to eliminate the individual differences existing in the fine movement driving apparatuses.

Now, in conjunction with FIG. 6, a recording/reproducing apparatus according to a third embodiment of the present invention will be described.

Figure 6:
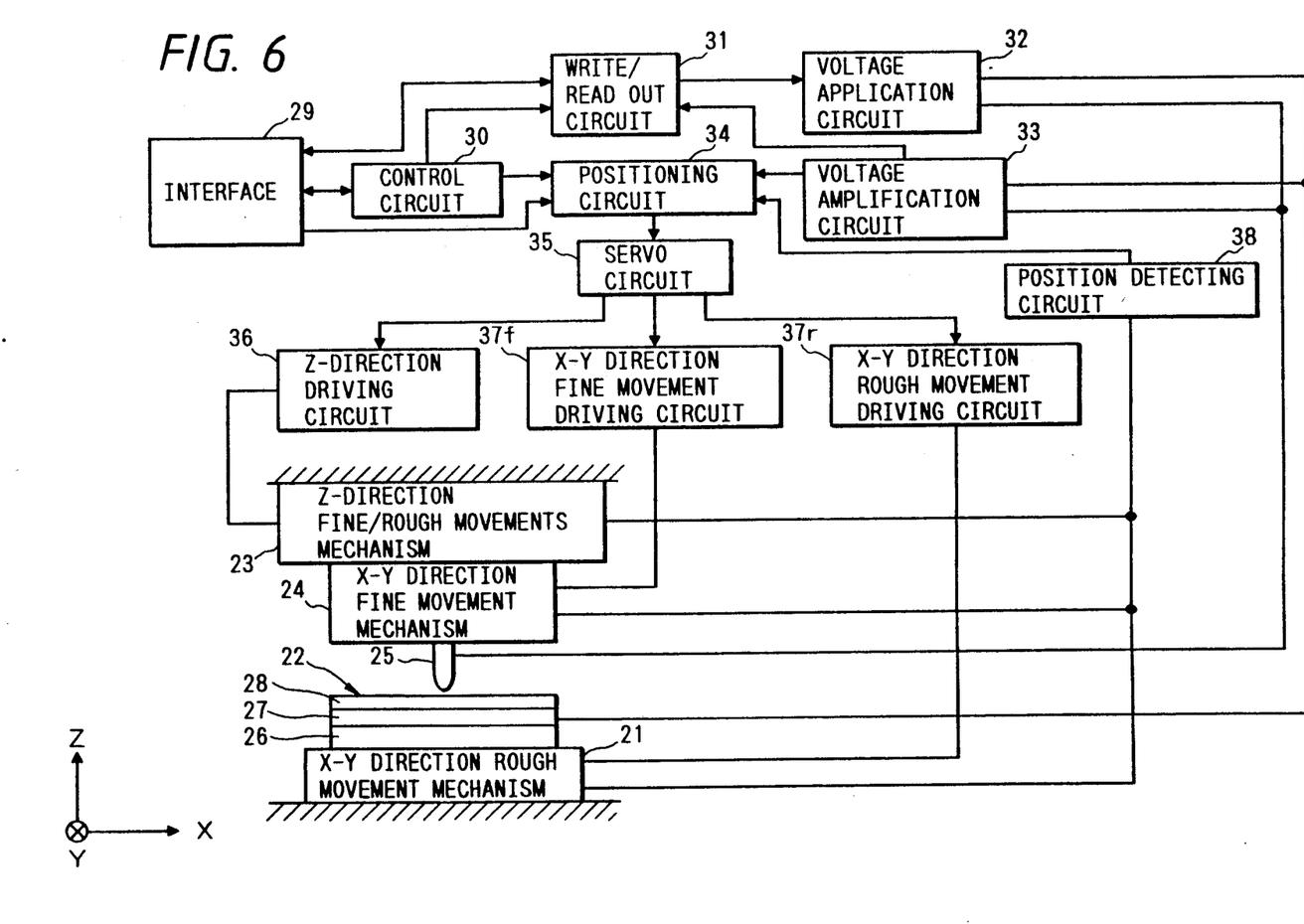
FIG. 6 a block diagram schematically showing a recording/reproducing apparatus according to a third embodiment.

FIG. 6 is a diagrammatic view showing the structure of the information recording and reproducing apparatus, in which a recording medium 22 is mounted on an x-y direction rough movement driving mechanism 21 to enable the rough movement within the x-y plane. A z-direction fine rough movements driving mechanism 23 is arranged above the medium 22. An x-y direction fine movement driving mechanism 24 is mounted on the driven portion of lower surface of the mechanism 23 to drivingly support a tangusten probe electrode 25 produced by an electrolytic polishing. The tip edge of the probe electrode 25 is placed close to the surface of the recording medium 22. The recording medium 22 is formed in such a manner that on a substrate 26 produced by polishing glass, a base electrode 27 is formed with gold (Au) on a chrome base layer by a vacuum deposition, and a recording layer 28 of graphite (HOPG) is bonded by a conductive adhesive agent thereon. The recording/reproducing area of the surface of the recording layer 28 is smoothed by cleavage in atomic order. On the other hand, an interface 29 which serves as a connection to upstream side apparatus of the information recording/reproducing apparatus is connected to the above-mentioned driving mechanisms, recording medium 22 and probe electrode 25 through the electric circuits given below. In other words, there are provided a control circuit 30 to perform central control of interrelated operations between the respective blocks in the information recording/reproducing apparatus; a write/readout circuit 31 to write or readout the write/readout data in accordance with command from the control circuit 30; a voltage application circuit 32 to write data by applying a pulse voltage between the probe electrode 25 and the base electrode 27 in accordance with signal from the write/readout circuit 31 or to apply a readout voltage when performing a readout; a voltage amplification circuit 33 to amplify the current flowing between the probe electrode 25 and recording medium 22 and to transmit this current to the write/readout circuit 31 as readout information signal when performing readout; a positioning circuit 34 to determine positions in the x-direction or y-direction in accordance with command from the control circuit 30 and others on the basis of signals from the voltage amplification circuit 33 or a position detecting circuit which will be described later; a servo circuit 35 to perform servo controls of the positions in the x-direction or y-direction on the basis of the servo signals from the positioning circuit 34; a z-direction driving circuit 36 to drive the z-direction fine/rough movements mechanism 23 in accordance with the signals from the servo circuit 35; an x-y direction fine movement driving circuit 37f and x-y direction rough movement driving circuit 37r to drive respectively the x-y direction fine movement driving mechanism 24 or the x-y direction rough movement driving mechanism 21 in accordance with the signals form the servo circuit 35; and the position detecting circuit 38 to detect the relative positions of the probe electrode 25 and recording medium 22.

In the present embodiment, the x-y direction fine movement driving mechanism 24 and the x-y direction fine movement driving circuit 37f are structured as shown in FIG. 4 or FIG. 5, and the command signals from the servo circuit 35 are inputted into the amplifier 15 of each circuit for x and y-direction drivings to perform the aforesaid driving controls.

Subsequently, the operation of the information recording/reproducing apparatus will be described. The probe electrode 25 is initially positioned slightly above the medium 22 in order to avoid any contact with the recording medium 22, and when in use, it is caused to be positioned close to the recording medium 22 by means of the z-direction rough movement driving mechanism 23. At this juncture, a 200 mV read voltage is applied by the voltage application circuit 32 between the probe electrode 25 and the base electrode 27 of the recording medium 22. Then, the electrodes are caused to approach each other until the current being detected by the voltage amplification circuit 33 becomes 100 pA, and the z-direction fine/rough movements driving mechanism 23 is held. Subsequently, using the x-y direction fine movement driving mechanism 24, scanning is performed over the recording medium 22 to record information or reproduce recorded information. Recording is performed by applying the pulse voltage from the voltage application circuit 32 at write positions commanded by the control circuit 30 while the probe electrode 25 is caused to scan the recording area of the recording medium 22 line by line. This pulse voltage is 4 (V) of pulse height and one (1) (μs) of pulse width, which is a threshold value for which the portion of the graphite layer where a voltage is applied is changed into a concavity. Reproducing is performed by reading the change in current in the voltage amplification circuit 33 by scanning the recording area with the probe electrode 25 using the x-y direction fine movement driving mechanism 24 while a 200 (mV) readout voltage is being applied from the voltage application circuit 32 between the probe electrode 25 and base electrode 27.

The above-mentioned apparatus is a recording/reproducing apparatus, but it is needless to mention that the apparatus can be either for recording or for reproducing only. It should be noted that the conditions required for writing and reading are not confined to the above-mentioned example. Also, the x-y direction fine movement driving circuit and x-y fine movement driving mechanism which are provided on the probe electrode side, may be arranged on the recording medium side.

In each of the above-mentioned embodiments of the fine movement driving apparatus, since an increased amount of a voltage applied to one piezoelectric element exactly accords with a decreased amount of that applied to the other piezoelectric element, the extended and contracted amounts of the piezoelectric elements on both sides are the same. Therefore, there is no useless stress applied to the piezoelectric elements. Hence, the deterioration of the elements can be prevented to enable a precise fine driving over a long period.

What is claimed is:

1. A driving apparatus for driving an object, comprising:
   a pair of piezoelectric elements, one of said pair of piezoelectric elements being arranged on one side of said object, and the other of said pair of piezoelectric elements being arranged on the other side of said object, wherein each electrode arrangement direction of said pair of piezoelectric elements is substantially identical to each other; and
   a control circuit, said control circuit applying a predetermined voltage between outer electrodes of said pair of piezoelectric elements, and said control circuit giving an equipotential to inner electrodes of said pair of piezoelectric elements,
   wherein said control circuit allows the equipotential given to said inner electrodes to be varied, thereby causing said pair of piezoelectric element to drive said object, and
   wherein said control circuit allows the potential given to said inner electrodes to be obtained by adding a predetermined potential to an intermediate potential and for resistance dividing of a predetermined voltage applied between said outer electrodes.

2. An apparatus according to claim 1, wherein each outside of said pair of piezoelectric elements is secured to a frame member which surrounds said object.

3. An apparatus according to claim 2, further comprising a connecting member for connecting said frame member and said object so as to be relatively movable in said direction.

4. An apparatus according to claim 1, further comprising means for adjusting the voltage to be applied between said outer electrodes.

5. A driving apparatus for driving an object, comprising:
   a first pair of piezoelectric elements, one of said first pair of piezoelectric elements being arranged on one side of a first direction of said object, and the other of said first pair of piezoelectric elements being arranged on the other side of said first direction of said object, wherein each electrode arrangement direction of said first pair of piezoelectric elements is substantially identical to said first direction;
   a first control circuit, said first control circuit applying a predetermined voltage between outer electrodes of said first pair of piezoelectric elements, and said first control circuit giving an equipotential to inner electrodes of said first pair of piezoelectric elements, wherein said first control circuit allows value of the potential given to said inner electrodes to be varied, thereby causing said first pair of piezoelectric elements to drive said object in said first direction;
   a supporting member for supporting each outer portion of said first pair of piezoelectric elements;
   a second pair of piezoelectric elements, one of said second pair of piezoelectric elements being arranged on one side of a second direction which is different from the first direction of said supporting member, and the other of said second pair of piezoelectric elements being arranged on the other side of said second direction of said supporting member, wherein each electrode arrangement direction of said second pair of piezoelectric elements is substantially identical to said second direction; and
   a second control circuit, said second control circuit applying a predetermined voltage between outer electrodes of said second pair of piezoelectric elements, and said second control circuit giving an equipotential to inner electrodes of said second pair of piezoelectric elements, wherein said second control circuit allows value of the potential given to said inner electrodes to be varied, thereby causing said second pair of piezoelectric elements to drive said supporting member in said second direction, further causing said object to be driven in said second direction, and
   wherein said first and second control circuits allow the potential given to said inner electrodes of each of said first and second pair of piezoelectric elements to be obtained by adding a predetermined potential to an intermediate potential and for resistance dividing of a predetermined voltage applied between the corresponding outer electrodes.

6. An apparatus according to claim 5, wherein each outside of said second pair of piezoelectric elements is secured to a frame member which surrounds said supporting member.

7. An apparatus according to claim 6, further comprising a connecting member for connecting said frame member and said supporting member so as to be relatively movable in said second direction.

8. An apparatus according to claim 5, further comprising a connecting member for connecting object and supporting member to connect said supporting member and said object so as to be relatively movable in said first direction.

9. An apparatus for recording information to a recording medium, comprising:
   a mechanism supporting the recording medium;
   a probe recording information to the information recording medium;
   a movable device to which said probe is attached;
   a pair of piezoelectric elements, one of said pair of piezoelectric elements being arranged on one side of said movable device, the other of said pair of piezoelectric elements being arranged on the other side of said movable device, wherein each electrode arrangement direction of said pair of piezoelectric elements is substantially identical to each other; and
   a control circuit, said control circuit applying a predetermined voltage between outer electrodes of said pair of piezoelectric elements, and said control circuit giving an equipotential to inner electrodes of said pair of piezoelectric elements, wherein said control circuit allows the equipotential given to said inner electrodes to be varied, thereby causing said pair of piezoelectric elements to drive said movable device so that said probe and said information recording medium are relatively moved, and wherein said control circuit allows the potential given to said inner electrodes to be obtained by adding a predetermined potential to an intermediate potential and for resistance dividing of a predetermined voltage applied between said outer electrodes.

10. An apparatus according to claim 5, further comprising means for adjusting the voltage to be applied between said outer electrodes.

11. An apparatus according to claim 9, wherein each outside of said pair of piezoelectric elements is secured to a frame member which surrounds said moveable device.

12. An apparatus according to claim 11, further comprising a connecting member for connecting said frame member and said moveable device so as to be relatively movable in said direction.

13. An apparatus according to claim 9, further comprising means for adjusting the voltage to be applied between said outer electrodes.

14. An apparatus for reproducing information from a recording medium, comprising:
 a supporting mechanism supporting the recording medium;
 a probe reproducing information from the information recording medium;
 a movable device to which said probe is attached;
 a pair of piezoelectric elements, one of said pair of piezoelectric elements being arranged on one side of said movable device, the other of said pair of piezoelectric elements being arranged on the other side of said movable device, wherein each electrode arrangement direction of said pair of piezoelectric elements is substantially identical to the other; and
 a control circuit, said control circuit applying a predetermined voltage between outer electrodes of said pair of piezoelectric elements, and said control circuit giving an equipotential to inner electrodes of said pair of piezoelectric elements, wherein said control circuit allows the equipotential given to said inner electrodes to be varied, thereby causing said pair of piezoelectric elements to drive said movable device so that said probe and said information recording medium are relatively moved, and
 wherein said control circuit allows the potential given to said inner electrodes to be obtained adding a predetermined potential to an intermediate potential and for resistance dividing of a predetermined voltage applied between said outer electrodes.

15. An apparatus according to claim 14, wherein each outside of said pair of piezoelectric elements is secured to a frame member which surrounds said movable device.

16. An apparatus according to claim 15, further comprising a connecting member for connecting said frame member and said moveable device so as to be relatively movable in said direction.

17. An apparatus according to claim 14, further comprising means for adjusting the voltage to be applied between said outer electrodes.

18. An apparatus for recording information to a recording medium, comprising:
 a mechanism supporting the recording medium;
 a probe for recording information to the information recording medium;
 a movable device to which said probe is attached;
 a first pair of piezoelectric elements, one of said first pair of piezoelectric elements being arranged on one side of a first direction of said movable device, and the other of said first pair of piezoelectric elements being arranged on the other side of said first direction of said movable device, wherein each electrode arrangement direction of said first pair of piezoelectric elements is substantially identical to said first direction;
 a first control circuit, said first control circuit applying a predetermined voltage between outer electrodes of said first pair of piezoelectric elements, and said first control circuit giving an equipotential to inner electrodes of said first pair of piezoelectric elements, wherein said first control circuit allows the equipotential given to said inner electrodes to be varied, thereby causing said first pair of piezoelectric elements to drive said movable device in said first direction;
 a supporting member supporting each outer portion of said first pair of piezoelectric element;
 a second pair of piezoelectric elements, one of said of second pair of piezoelectric elements, one on one side of a second direction which is different from the first direction of said supporting member, and the other of said second pair of piezoelectric elements being arranged on the other side of said second direction of said supporting member, wherein each electrode arrangement direction of said second pair of piezoelectric elements is substantially identical to said second direction; and
 a second control circuit, said second control circuit applying a predetermined voltage between outer electrodes of said second pair of piezoelectric elements, and said second control circuit giving an equipotential to inner electrodes of said second pair of piezoelectric elements, wherein said second control circuit allows the equipotential given to said inner electrodes to be varied, thereby causing said second pair of piezoelectric elements to drive said supporting member in said second direction, further causing said movable device to be driven in said second direction, and
 wherein said first and second control circuits allow the potential given to said inner electrodes of each pair of piezoelectric elements to be obtained by adding a predetermined potential to an intermediate potential which and for resistance dividing of a predetermined voltage applied between the corresponding outer electrodes.

19. An apparatus according to claim 18, wherein each outside of said first and second pair of piezoelectric elements is secured to a frame which surrounds said movable device.

20. An apparatus according to claim 19, further comprising a connecting member for connecting said frame member and said moveable device so as to be relatively movable in said first and second directions.

21. An apparatus according to claim 18, further comprising means for adjusting the voltage to be applied between said outer electrodes.

22. An apparatus for reproducing information from a recording medium, comprising:
   a mechanism supporting the recording medium;
   a probe for reproducing information from the information recording medium;
   a movable device to which said probe is attached;
   a first pair of piezoelectric elements, one of said first pair of piezoelectric elements being arranged on one side of a first direction of said movable device, and the other of said first pair of piezoelectric elements being arranged on the other side of said first direction of said movable device, wherein each electrode arrangement direction of said first pair of piezoelectric elements is substantially identical to said first direction;
   a first control circuit, said first control circuit applying a predetermined voltage between outer electrodes of said first pair of piezoelectric elements, and said first control circuit giving an equipotential to inner electrodes of said first pair of piezoelectric elements, wherein said first control circuit allows the equipotential given to said inner electrodes to be varied, thereby causing said first pair of piezoelectric elements to drive said movable device in said first direction;
   a supporting member supporting each outer portion of said first pair of piezoelectric elements;
   a second pair of piezoelectric elements, one of said second pair of piezoelectric elements being arranged on one side of a second direction which is different from the first direction of said supporting member, and the other of said second pair of piezoelectric elements being arranged on the other side of said second direction of said supporting member, wherein each electrode arrangement direction of said second pair of piezoelectric elements is substantially identical to said second direction; and
   a second control circuit, said second control circuit applying a predetermined voltage between outer electrodes of said second pair of piezoelectric elements, and said second control circuit giving an equipotential to inner electrodes of said second pair of piezoelectric elements, wherein said second control circuit allows the equipotential given to said inner electrodes to be varied, thereby causing said second pair of piezoelectric elements to drive said supporting member in said second direction, further causing said movable device to be driven in said second direction, and
   wherein said first and second control circuits allow the equipotential given to said inner electrodes of each of said first and second pair of piezoelectric elements to be obtained by adding a predetermined potential to an intermediate potential and for resistance dividing of a predetermined voltage applied between the corresponding outer electrodes.

23. An apparatus according to claim 22, wherein the outside of each of said first and second pair of piezoelectric elements is secured to a frame member which surrounds an moveable device.

24. An apparatus according to claim 23, further comprising a connecting member for connecting said frame member and said object so as to be relatively movable in said first and second directions.

25. An apparatus according to claim 22, further comprising means for adjusting the voltage to be applied between said outer electrodes of each of said first and second pair of piezoelectric elements.

* * * * *

UNITED STATES PATENT AND TRADEMARK OFFICE
CERTIFICATE OF CORRECTION

PATENT NO. : 5,297,130
DATED : March 22, 1994
INVENTOR(S) : MASAHIRO TAGAWA ET AL.

BEST AVAILABLE COPY

Page 1 of 2

It is certified that error appears in the above-identified patent and that said Letters Patent is hereby corrected as shown below:

COLUMN 1

Line 20, "as" (first occurrence) should read --an--.

COLUMN 4

Line 18, "example" should read --example,--.
    Line 45, "the" (second occurrence) should read --be--.

COLUMN 7

Line 38, "element" should read --elements--.

COLUMN 9

Line 21, "moveable" should read --movable--.
    Line 25, "moveable" should read --movable--.
    Line 57, "obtained" should read --obtained by--.
    Line 67, "moveable" should read --movable--.

COLUMN 10

Line 30, "element;" should read --elements;--.
    Line 31, "of" (third occurrence) should be deleted.
    Line 32, "elements, one" should read
            --elements being arranged--.
    Line 58, "which" should be deleted.
    Line 67, "moveable" should read --movable--.

UNITED STATES PATENT AND TRADEMARK OFFICE
CERTIFICATE OF CORRECTION

PATENT NO. : 5,297,130
DATED : March 22, 1994
INVENTOR(S) : MASAHIRO TAGAWA ET AL.

BEST AVAILABLE COPY

Page 1 of 2

It is certified that error appears in the above-identified patent and that said Letters Patent is hereby corrected as shown below:

COLUMN 12

Line 27, "an moveable" should read --a movable--.

Signed and Sealed this

Eighth Day of November, 1994

Attest:

BRUCE LEHMAN

Attesting Officer

Commissioner of Patents and Trademarks